Feb. 5, 1963    R. W. ILLSLEY    3,076,487
COMMINUTING APPARATUS
Filed Aug. 10, 1959    7 Sheets-Sheet 1
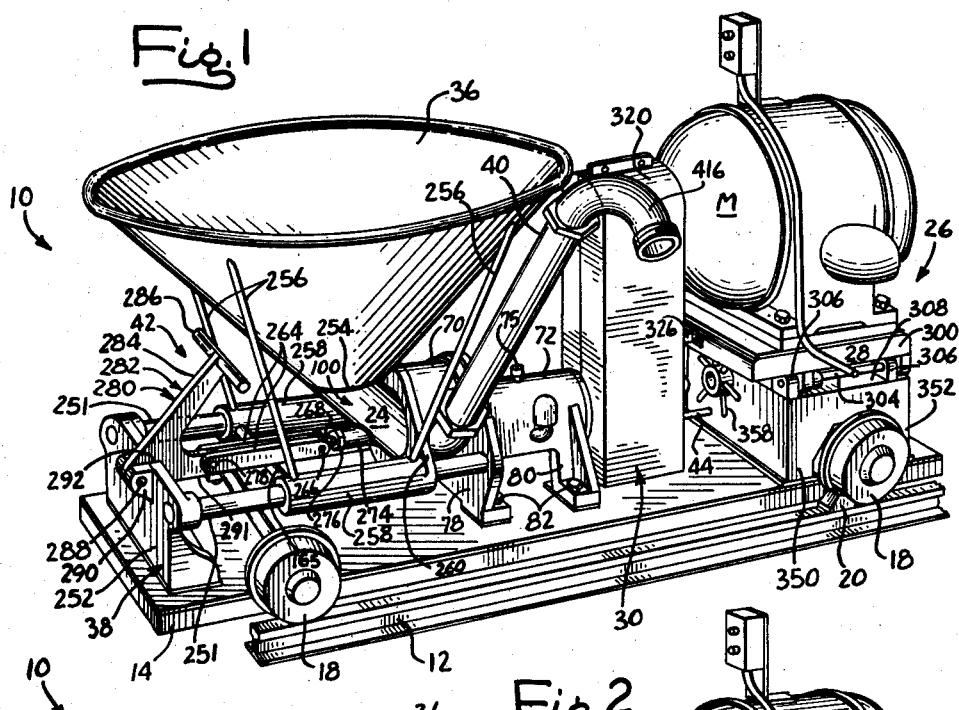
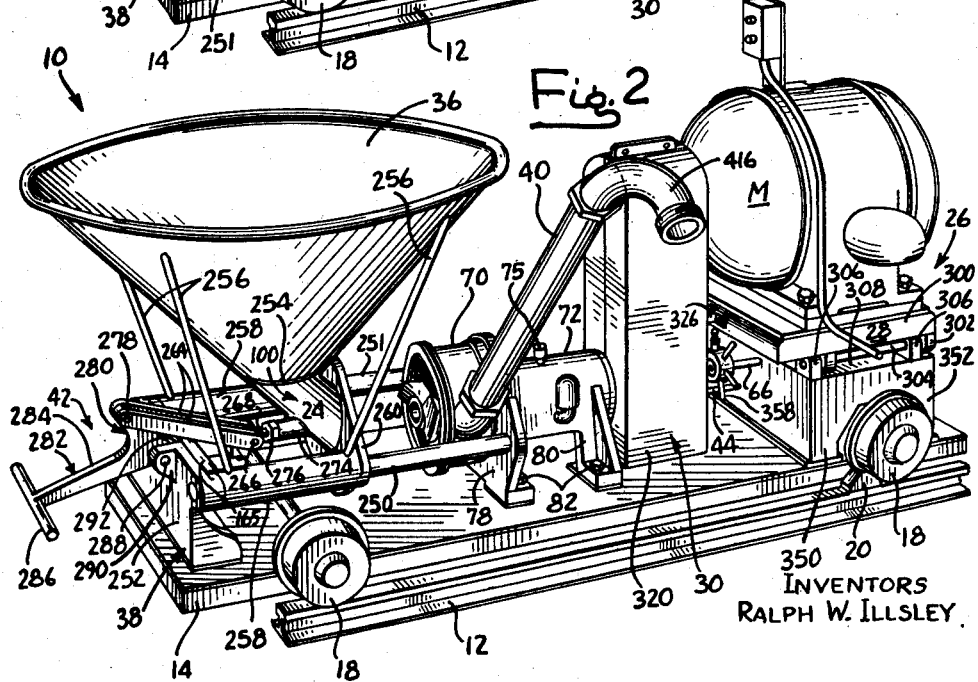
INVENTORS
RALPH W. ILLSLEY
BY
ATTY.

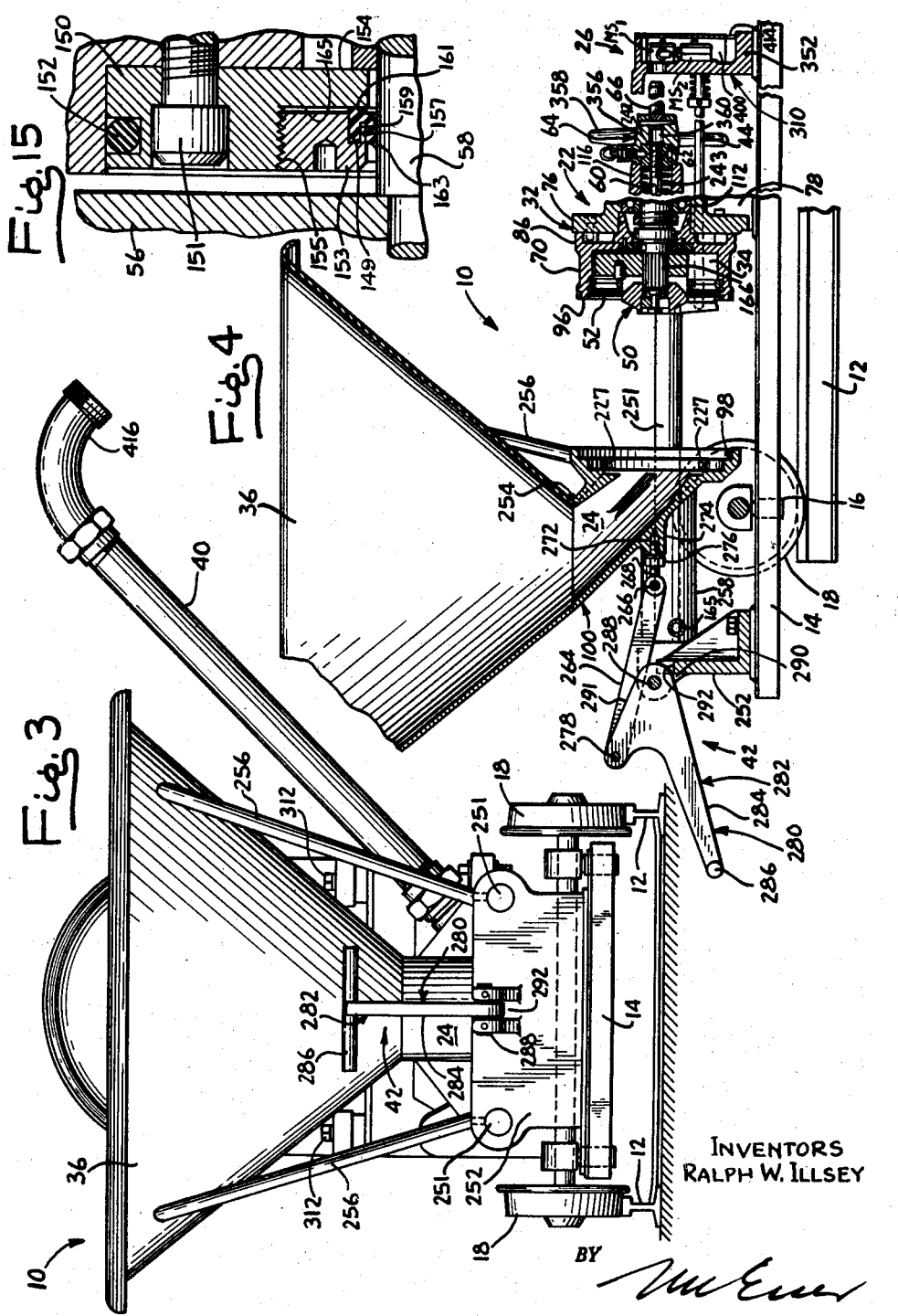

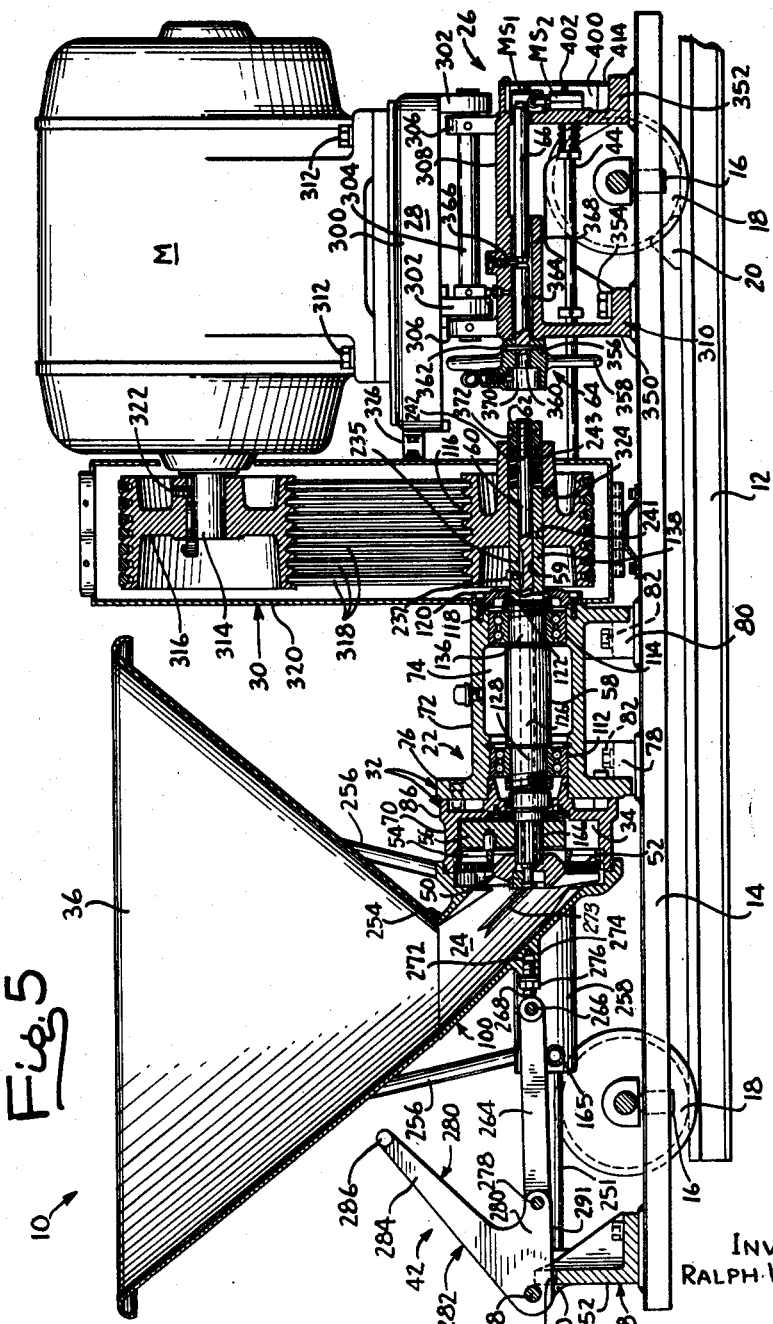

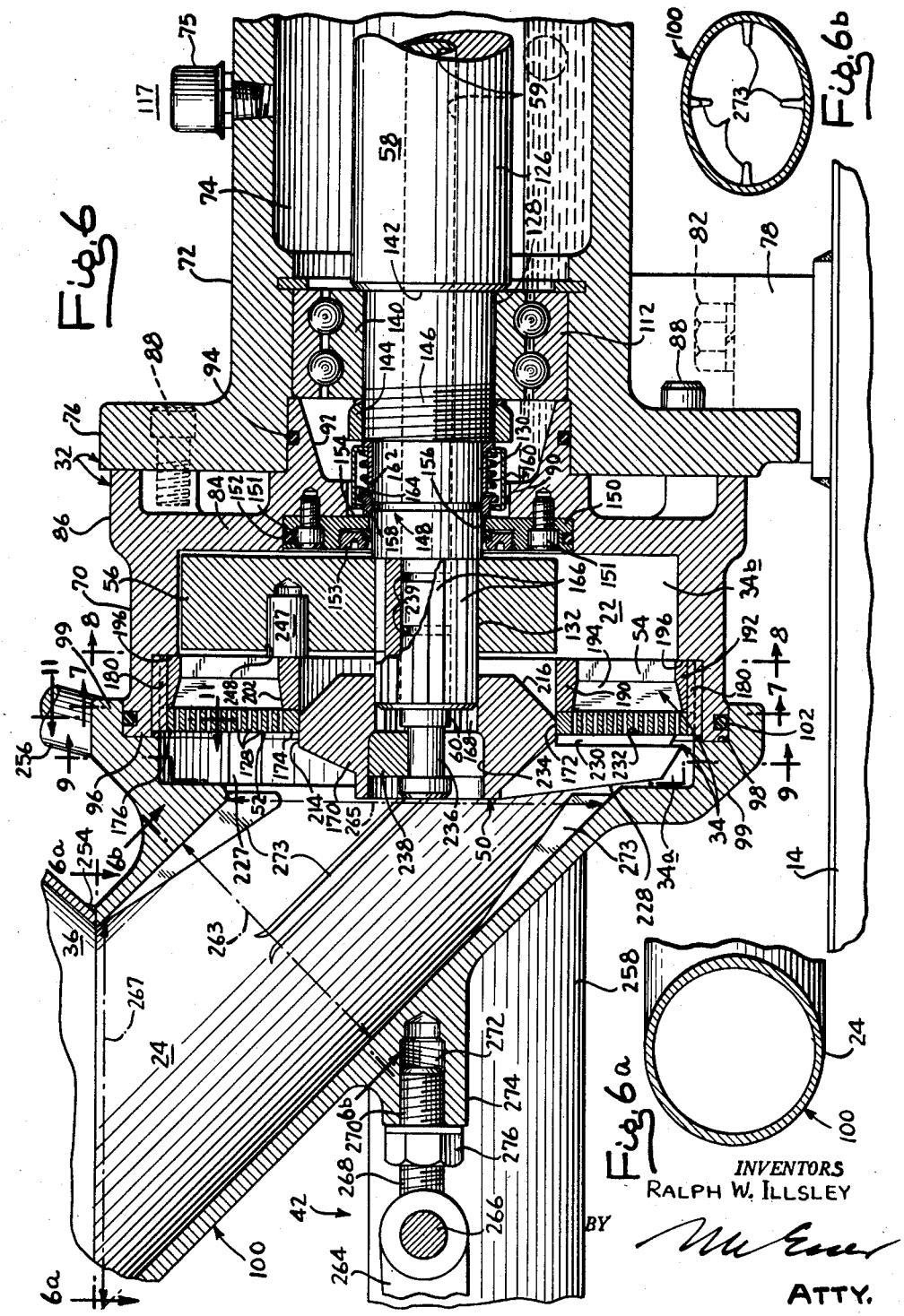

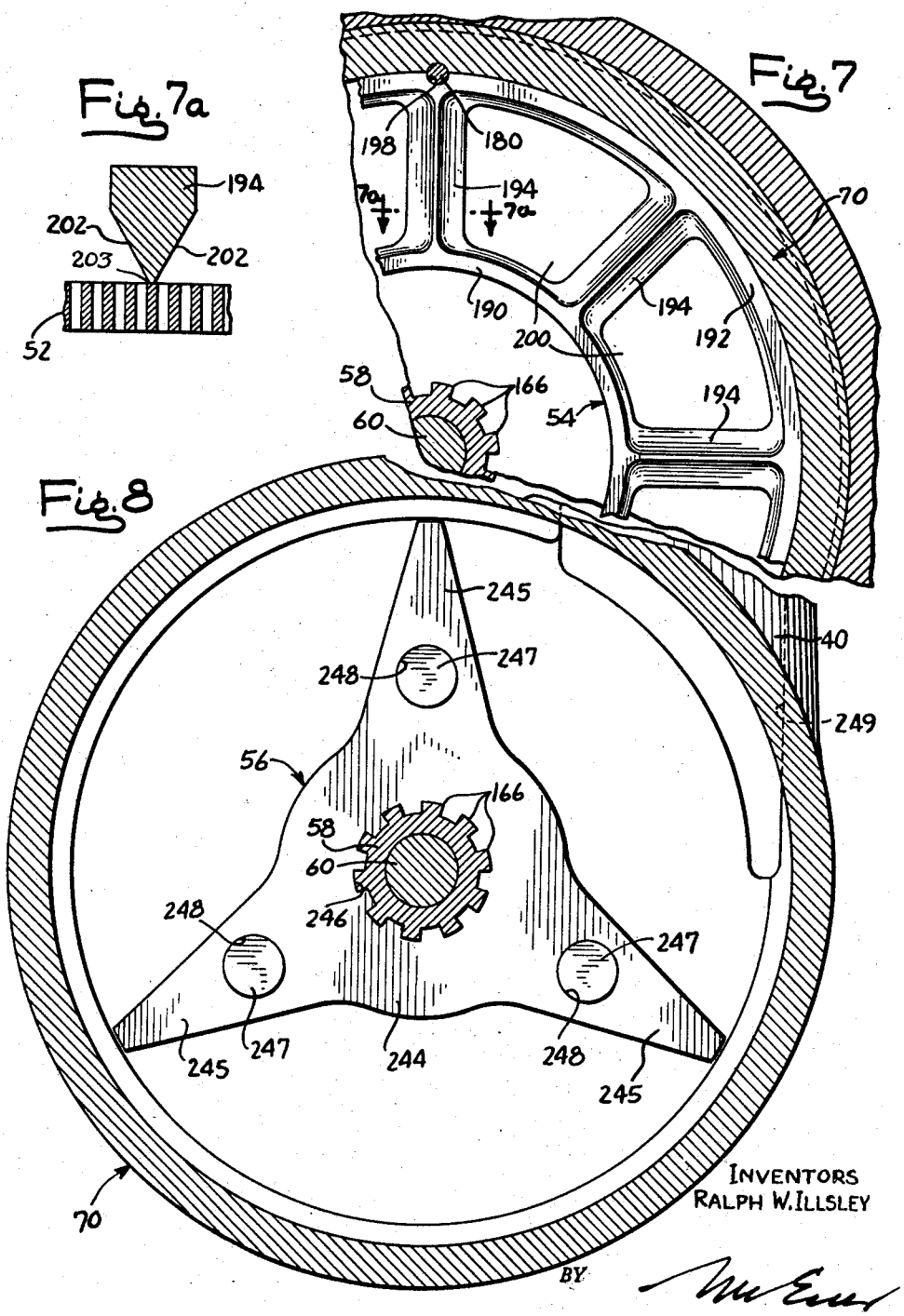

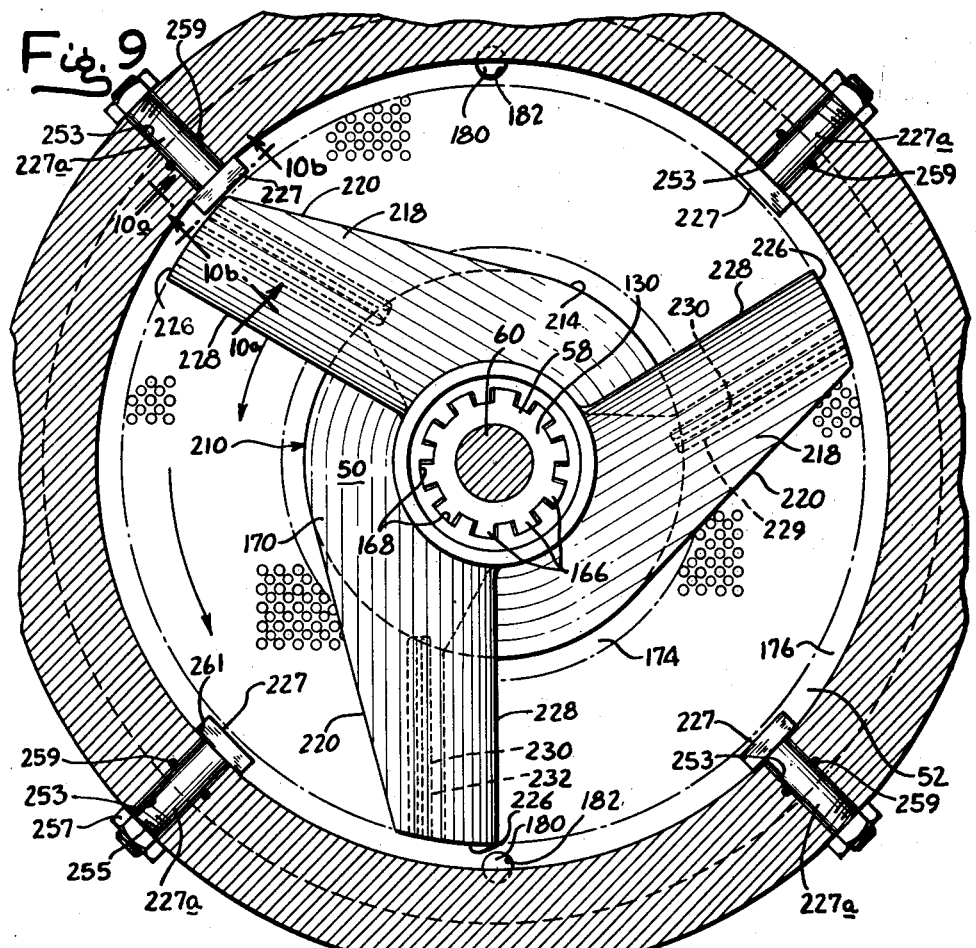
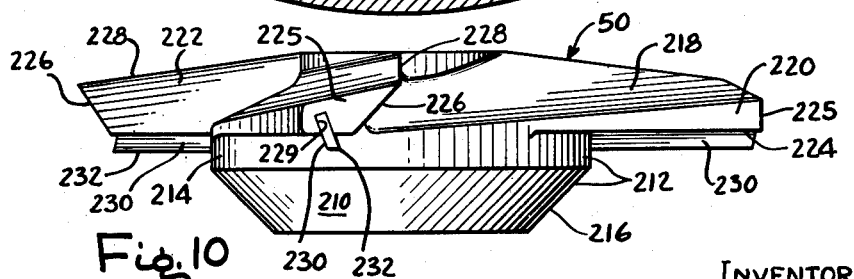
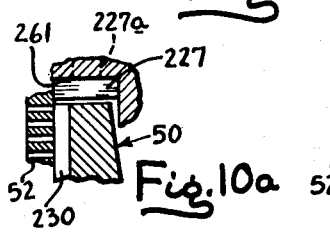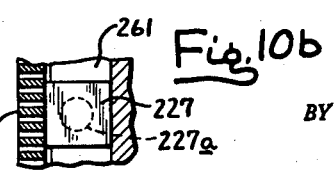

Feb. 5, 1963  R. W. ILLSLEY  3,076,487
COMMINUTING APPARATUS
Filed Aug. 10, 1959  7 Sheets-Sheet 7
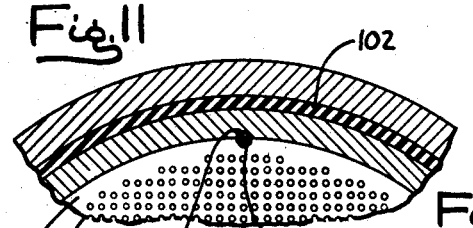
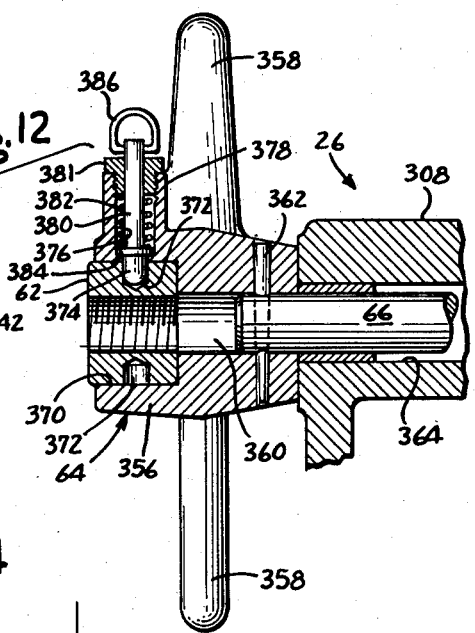
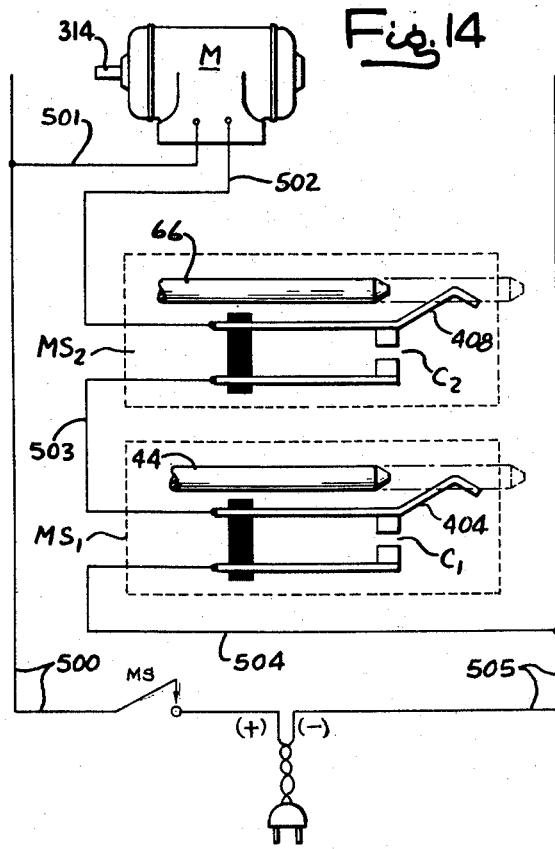
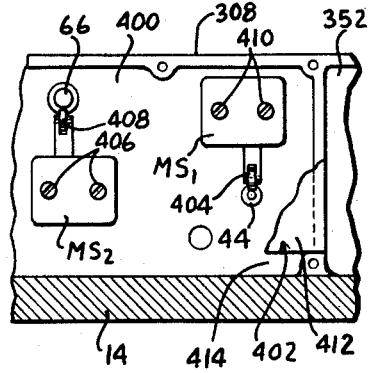
INVENTORS
RALPH W. ILLSLEY
BY
ATTY.

United States Patent Office 3,076,487
Patented Feb. 5, 1963

3,076,487
COMMINUTING APPARATUS
Ralph W. Illsley, Chicago, Ill., assignor to Chemetron Corporation, Chicago, Ill., a corporation of Delaware
Filed Aug. 10, 1959, Ser. No. 832,512
14 Claims. (Cl. 146—182)

The improved comminuting apparatus comprising the present invention has been designed for use primarily in connection with the comminution and emulsifying of animal foodstuffs and the like, as, for example, non-calciferous parts of certain animals. Such foodstuffs are ordinarily, in themselves, inedible, but when they are so comminuted and emulsified they are converted from a conglomerate mixture into an homogenous mass of a semi-liquid nature and they are thus rendered edible. Of such a character is commercial sausage meat. The invention is, however, capable of other uses and the comminuting apparatus of the present invention may, if desired, with or without modification, be employed for the comminution of other comestibles, as, for examples, vegetable products or a mixture of vegetable and meat products. Irrespective, however, of the particular use to which the present invention may be put, the essential features thereof are at all times preserved.

The invention is particularly concerned with comminuting apparatus of the type wherein a cutting head having associated therewith a plurality of cutting blades or knives is driven from a suitable source of power such as an electric motor and rotates within a housing in shearing relation to a perforated shear plate, comminuting of the material taking place within the housing on one side of the plate with the comminuted material flowing forwardly through the holes or perforations in the shear plate into a discharge chamber from whence the material passes outwardly through a discharge opening or spout.

It is among the general objects of the present invention, in a machine of the type briefly outlined above, to provide an apparatus of improved design and construction which will more effectively perform its intended function, both as regards the effectiveness of its cutting operation and as regards the volume of the product capable of being handled by an apparatus of any given size over a given period of machine operation.

Specifically, the objects of the invention are manifold, and principal among them is the provision of a comminuting apparatus of this sort which employs a rotary cutter assembly of improved design, together with novel mounting means therefor whereby the knife blades associated with the assembly will at all times seat squarely against the shearing surface of the shear plate with which the assembly is associated while at the same time the blades are yieldingly urged against the shear plate with a degree of tension that does not vary during the operation of the apparatus.

In carrying out the above mentioned objects, and in order to insure equal application of pressure on the shear plate by the shearing edges of the rotary cutting blades or knives at varying radial distances, novel means are provided for reinforcing the shear plate at such radial distances. Accordingly, it is an ancillary object of the invention to provide a novel form of backing spider for the shear plate, which spider, although reinforcing the shear plate by contact therewith at widely separated regions therearound, is so designed as to offer but very little resistance to the passage of the product therethrough. By the provision of such a backing spider, the use of shear plates which are of less thickness than conventional shear plates having the same capacity and designed for the same purpose is made possible.

Another important object of the invention is to provide such an apparatus wherein novel gristle breaking or shearing means are provided whereby particles or lumps of material which, in conventional apparatus, ordinarily are not severable by the cutter assembly and which, therefore, tend to clog the perforated shear plate, are effectively broken up, ruptured, divided, severed or otherwise softened or partially comminuted so that the thus broken or softened particles are rendered amenable to the shearing action of the cutter assembly against the shear plate.

Briefly, in carrying out this last mentioned object, the invention contemplates the provision of a plurality of wearable, hardened replaceable steel gristle breaking lugs which are secured to the wall of the chamber which encloses the comminuting instrumentalities and which are designed for cooperation with rotary elements on the cutter assembly to effect the gristle breaking function, such rotary elements being independent from the knife blades proper. By such an arrangement, the gristle breaking functions which, in conventional apparatus, ordinarily are effected by the knife blades proper, are in the present instance effected independently of the knife blades proper so that these blades, as well as the shear plate, will not become overloaded or clogged. Additionally, by an arrangement of this character, the cutting relationship between the gristle breaking lugs and the rotary elements on the cutter assembly which cooperate therewith is maintained constant regardless of cutter blade or knife wear, or of shear plate wear.

A further important object of the invention, in a machine of this character, is to provide a novel form of cutter assembly having means associated therewith whereby the product which is operated upon by the assembly is automatically impelled forwardly against and through the shear plate under the propelling influence of the cutter assembly itself. In carrying out this object, the invention provides a cutter body or head having cutter blade-supporting arms projecting generally radially outwardly therefrom, each blade-supporting arm presenting a leading product-penetrating cutting edge which extends in the direction of rotation of the blade supported thereby and which is spaced from the shearing face of the shear plate. The knife blade associated with each blade-supporting arm presents a shearing edge which sweeps around the surface of the perforated shear plate and which trails the product penetrating edge of the arm. Immediately behind the leading product-penetrating edge of each arm, and between this edge and the shearing edge of the knife blade, the cutter body is formed with a surface which is inclined with respect to the plane of the perforated shear plate and which exerts a camming or impelling action on the product which has been severed by the leading product-penetrating edge and tends to force the product forwardly against the face of the perforated shear plate. Stated in other words, the inclined surfaces of the cutter body serve to establish a region of high pressure within the product undergoing comminuting between the blade-supporting arms and the shear plate tending to force the material through the plate perforations into the discharge chamber of the apparatus.

It is another object of the invention to provide a comminuting apparatus of this general character having associated therewith means whereby the conglomerate mixture which comprises the product which is to be comminuted, is introduced into the apparatus in the immediate vicinity of the cutting and shearing instrumentalities so that this mixture is directly and immediately attacked by the rotating knife blades and is quickly moved to the discharge region of the apparatus thereby clearing the way for additional oncoming products. By such an arrangement, the knife blades operate in the open, so to speak, and the building up of a solid column of the product in the hopper throat preceding the comminuting chamber in advance of the rotating knife blades is avoided so that the customary feeding of the products under pressure or manual "stuffing" of the machine is not required.

Yet another object of the invention is to provide a comminuting apparatus wherein the various operative parts thereof are capable of extreme ease of assembly and disassembly for purposes of cleaning, inspection of parts, replacement or repair thereof, or substitution of parts to accommodate different kinds of raw product ingredients or to provide comminuted material of different degrees of fineness. In carrying out this object, novel means are provided whereby the feed hopper for the comminuting chamber is movable bodily as a unit toward and away from the comminuting chamber housing, into and out of operative register therewith respectively. When the hopper is in its operative position of register with the housing, the various moving comminuting instrumentalities are concealed and are shielded by the hopper so that contact therewith by the person or clothing of the operator is avoided. When the hopper is in its retracted position out of register with the housing, the various comminuting instrumentalities are exposed to view and are readily accessible for superficial cleaning of the comminuting chamber while at the same time means are made available whereby these instrumentalities may be "unlocked" so to speak from their normal cooperating positions in the assembly for purposes of dismantling the machine preparatory to a more thorough cleaning of the parts thereof. At the same time, the withdrawn hopper assembly is conveniently accessible for cleaning purposes, both from the feeding end thereof and from the discharge or throat end.

A similar and related object of the invention is to provide a novel assembly of comminuting instrumentalities including the rotary cutter assembly, its cooperating shear plate, a backing spider for the shear plate, and an impeller for centrifugal discharge of the comminuted product from the chamber, these various parts being held in their operative cooperating relationship under the control of a single fastening device in the form of a nut which when unloosened and removed from the assembly, releases the various parts for dismantling. Still further, according to the invention, novel tool means are provided for thus unloosening and removing the fastening nut, as well as for replacing and tightening the same, the tool means constituting an operative and permanent part of the machine and serving, when the nut is removed from its fastening position, to retain the same in a stored position so that the nut will not become misplaced or lost.

In connection with this last mentioned object, an important feature of the invention resides in the provision of means whereby, upon replacing of the fastening nut and tightening of the same to maintain the various comminuting instrumentalities in their operative position, a constant and proper predetermined degree of pressure between the operative shearing elements associated with the cutter assembly cannot be exceeded so that binding of the various parts is avoided while at the same time a uniform shearing effect is attained. More specifically, according to the invention, the fastening nut has associated therewith a tensioning spring which, when the nut is driven to its final home position, is placed under compression in such a manner that an ideal predetermined degree of constant clamping force is applied to the rotary cutter device tending to force the same against the shear plate. The purpose of the fastening nut is not only to maintain the various comminuting instrumentalities in their assembled relationship, but also to exert pressure on the tensioning spring and thus establish the proper degree of pressure between the cutter device and the shear plate. By making it impossible, in the normal application thereof during replacement of the nut after any given dismantling operation, to overtighten the nut, the latter is not relied upon for tension adjustment purposes and the same may be reapplied in position with no particular degree of care being required in the application thereof, and with the certainty that when so reapplied, the necessary and proper degree of tension will be applied to the tensioning spring.

To vary the spring tension and establish different degrees of pressure between the cutter device and the shear plate, the use of replacement springs of varying rate, or the use of spacing washers to limit the extent of threaded engagement of the fastening nut on the threaded element to which it is applied may be resorted to.

Another related object is to provide such an actuating tool means for the fastening nut, together with a novel form of safety mechanism whereby, when the tool proper is moved to an operative nut-engaging position, the electric circuit for the driving motor of the apparatus is automatically deenergized so that the power train leading to the cutter drive shaft is disabled and possible injury to the operator is avoided, while at the same time jamming of the machine and damage to the parts thereof is avoided.

Still further, according to the present invention, additional precautionary means are provided whereby, when the feed hopper assembly is moved toward its retracted position out of register with the housing for the comminuting instrumentalities, the motor circuit will be deenergized. By such an arrangement, operation of the exposed cutting instrumentalities during cleaning operations, for example, is made impossible.

Another and important object of the invention, in a comminuting and emulsifying apparatus of the general character set forth above, is to provide a novel form of hopper construction, which construction presents an internal configuration or shape characteristic which is conducive toward free and easy flow of the food product ingredients admitted to the comminuting chamber with a minimum of frictional resistance thereto. A related object of the invention is to provide such a hopper construction which is devoid of internal crevices or pockets and which also is conducive toward easy cleaning thereof.

The provision of a comminuting and emulsifying apparatus which is extremely simple in its construction as compared with machines intended for the same purpose and which, therefore, may be manufactured at a low cost; one which is possessed of a minimum number of relatively moving parts and which, therefore, is unlikely to get out of order; one which is rugged and durable and which, therefore, may be subjected to rough usage; one in which the principal parts thereof are formed of stainless steel so that there will be no oxidation or corrosive contamination of the product; one which is devoid of seams, cracks, crevices and the like in which product particles may collect and which, therefore, is conducive toward ease of cleaning; one in which the comminuting chamber thereof is adequately sealed from the atmosphere so that no air or lubricant can be pulled into the chamber; one which is semi-portable in that it is tractionally supported on rails in the vicinity of any given scene of operations so that it may be manually rolled into and out of operative feeding or discharging position; one which is attractive in its appearance and pleasing in its design; and one which, otherwise, is well adapted to perform the services required of it, are further desiderata which have been borne in mind in the production and development of the present invention.

Other objects and advantages of the invention, not at this time enumerated, will become readily apparent as the following description ensues.

In the accompanying seven sheets of drawings forming a part of this specification, one exemplary form of the invention has been shown.

In these drawings:

FIG. 1 is a perspective view of an assembled comminuting apparatus constructed in accordance with the principles of the present invention and showing the same in its operative condition;

FIG. 2 is a perspective view similar to FIG. 1 showing the apparatus in the condition which it assumes when hopper-cleaning operations are in progress;

FIG. 3 is a front end view of the apparatus shown in FIG. 1;

FIG. 4 is a fragmentary sectional view taken substantially centrally and vertically through the comminuting mechanism proper and the feed hopper therefor and showing the feed hopper in its retracted position;

FIG. 5 is a vertical sectional view taken substantially centrally and longitudinally through the comminuting apparatus and showing the same in its operative condition;

FIG. 6 is an enlarged fragmentary vertical sectional view taken substantially centrally through the apparatus in the vicinity of the comminuting chamber and showing the adjacent base portion of the feed hopper therefor;

FIG. 6a is a reduced sectional view taken substantially along the line 6a—6a of FIG. 6;

FIG. 6 is a reduced sectional view taken substantially along the line 6b—6b of FIG. 6;

FIG. 7 is a fragmentary quarter section view on an enlarged scale taken substantially along the line 7—7 of FIG. 6;

FIG. 7a is a sectional view on a further enlarged scale taken substantially along the line 7a—7a of FIG. 7;

FIG. 8 is a sectional view on an enlarged scale taken substantially along the line 8—8 of FIG. 6;

FIG. 9 is a sectional view on an enlarged scale taken substantially along the line 9—9 of FIG. 6;

FIG. 10 is a side elevational view of a cutter assembly employed in connection with the present invention;

FIG. 10a is a sectional view taken substantially along the line 10a—10a of FIG. 9;

FIG. 10b is a sectional view taken substantially along the line 10b—10b of FIG. 9;

FIG. 11 is an enlarged fragmentary sectional view taken substantially along the line 11—11 of FIG. 6;

FIG. 12 is an enlarged fragmentary vertical sectional view taken vertically and substantially centrally through a position of the apparatus in the vicinity of a capstan tool employed in connection with the present invention and showing the same operatively embracing and retaining a tensioning nut also forming an element of the invention;

FIG. 13 is a fragmentary detail view of an electrical switch box and its associated switch mechanism employed in connection with the invention;

FIG. 14 is a circuit diagram illustrating the operation of certain circuit breaking mechanism employed in connection with the invention; and FIG. 15 is an enlarged detail view of a portion of the structure shown in FIG. 6 in the vicinity of a rotary mechanical seal employed in connection with the invention.

BRIEF DESCRIPTION AND GENERAL CONSIDERATIONS

Referring now to the drawings in detail and in particular to FIGS. 1 and 2, a comminuting apparatus constructed in accordance with the principles of the present invention is designated in its entirety at 10. The apparatus 10 is portable to the extent that it may be moved into and out of operative position in relation to a suitable loading apparatus or with respect to a feed container such as a truck or the like from which the raw materials which constitute the product to be comminuted may be shoveled, dumped or otherwise fed to the feed hopper associated with the apparatus. Accordingly, the apparatus may be tractionally supported on a pair of rails 12 leading to a given scene of operation, the apparatus including a base plate 14 adjustably supported as at 16 (FIG. 5) on flanged traction wheels 18 adapted to travel on the rails 12. A chock member 20 is welded to one of the rails 12 and may be employed for limiting the extent of linear tractional movement of the apparatus in opposite directions into and out of operating position.

Briefly, the apparatus 10 involves in its general organization five principal assemblies including a comminuting and emulsifying apparatus proper 22, a feed hopper assembly 24 for the apparatus 22, a combined motor support and manipulating tool assembly 26, a motor assembly 28 and a power train assembly 30 operatively connected between the motor assembly and the comminuting assembly proper 22. The comminuting assembly proper 22 includes a generally cylindrical composite housing 32 providing, in combination with a portion of the feed hopper assembly, an internal enclosure or chamber 34 (see also FIG. 6) which serves to enclose the operative comminuting instrumentalities associated with the present apparatus. The feed hopper assembly 24 includes a feed hopper proper 36 which is slidable on a base support 38 toward and away from the housing 32 and into and out of operative register with the latter. When the hopper 36 is in its advanced position of registry with the housing 32, product materials loaded into the hopper will be fed to the comminuting instrumentalities within the forward region 34a of the chamber 34, comminuted thereby, and discharged from the rear region 34b of the chamber through a discharge conduit 40. When the feed hopper 36 is in its retracted position as shown in FIG. 2, it is out of operative register with the housing 32, and the hopper itself, as well as the comminuting instrumentalities, or at least certain of them, are accessible for inspection or cleaning purposes, as will be made more clear presently. Movement of the hopper toward and away from the housing 32 is manually effected under the control of a toggle joint mechanism which has been designated in its entirety at 42.

As best seen in FIG. 5, the feed hopper assembly 24, the power train assembly 30 and the motor supporting and tool retaining assembly 26 are disposed in longitudinal alignment on the base plate 14. The feed hopper assembly 24 has associated therewith a certain safety control mechanism which, as will be more clearly set forth presently, is operable under the control of a thrust rod 44 (FIGS. 2, 4 and 5) capable of being shifted axially in one direction when the feed hopper 36 is moved away from its operative position to actuate a certain circuit breaking mechanism subsequently to be described and disposed in the motor circuit associated with the motor assembly 28 and to deenergize such circuit so that operation of the motor, and consequently of the comminuting instrumentalities within the chamber 34 is prevented when the feed hopper is in a position other than its operative position.

The comminuting and emulsifying instrumentalities which are disposed within the chamber 34 includes a rotary cutter assembly 50, a perforated shear plate 52, a backing spider 54 for the shear plate 52 and an impeller 56 by means of which the comminuted and emulsified material is centrifugally discharged from the chamber 34 through the discharge conduit 40. The cutter assembly 50 and impeller 56 are operatively disposed on a tubular rotary drive shaft 58 having an axial bore 59 through which there extends a clamping rod or shaft 60 which is held in its clamping position by mechanism including a nut 62 adjacent its rear end. When the nut 62 is unfastened from the rod 60, the latter is released for removal purposes, together with the various operative comminuting instrumentalities clamped thereby.

While it is possible to unfasten the nut 62 by conventional means such as a hand wrench or the like, according to the present invention it is contemplated that this nut shall be manipulated only under the control of a "built-in" tool unit 64 in the form of a permanently mounted rotary capstan wrench carried on a rotatable and axially slidable shaft 66 which constitutes an element of the combined motor support and tool retaining assembly 26. The tool unit 64 and tool shaft 66 are axially aligned with the nut 62 and are movable between an advanced position wherein the tool unit engages the nut and a retracted position wherein the tool is remote from the nut. The tool shaft 66 cooperates with an additional circuit breaking mechanism to open the motor circuit whenever the tool assembly is withdrawn from its normally inoperative retracted position, as will be made clear presently. Thus, as a precautionary measure, the driving motor for the apparatus cannot be set into operation during nut-manipulating operations.

THE COMMINUTING ASSEMBLY PROPER

The Housing Assembly

Referring now to FIGS. 5 and 6, the housing 32 is of a two-piece sectional composite nature and includes a forward casing section 70 which provides the previously mentioned internal chamber 34 and a rear casing section 72 providing an internal lubricant reservoir 74 having a conventional air vent 75 associated therewith. The casing section 72 is of generally open-ended tubular construction and has a front end flange 76 and front and rear foot portions 78 and 80 respectively by means of which the section 72 is secured to the base plate 14, suitable fastening bolts 82 being provided for this purpose. The front casing section 70 is of cup-shape design and presents a radially extending rear wall 84 having a rearwardly projecting peripheral rim flange 86 which is clamped against the bolting flange 76 by means of suitable clamping bolts 88. The wall 84 is in the form of an annulus having a central opening 90 therethrough and a rearwardly projecting inner peripheral wall 92 which is telescopically received within the generally cylindrical casing section 72. The wall 92 carries a sealing ring 94 which may be in the form of a conventional O-ring and by means of which the lubricant chamber or reservoir 74 is sealed against egress radially to the atmosphere between the two casing sections 70 and 72.

The forward end of the cup-shaped casing section 70 is open and provides a forwardly projecting rim 96 adapted to fit telescopically within an annular recess 98 provided in the rim region 99 of a hopper throat 100 associated with the hopper assembly 24. An O-ring seal 102 between the two telescopic rim regions insures a separable but tight leak-proof seal between the casing section 70 and hopper throat 100 when the hopper assembly 24 is in its advanced position.

The Cutter Drive Shaft and Mounting Therefor

Still referring to FIGS. 5 and 6, the tubular rotary cutter drive shaft 58 extends axially through both casing sections 70 and 72 and is rotatably journalled in anti-friction bearings 112 and 114 interposed between the shaft and casing section 72 adjacent the front and rear ends of the latter respectively. The shaft 58 projects a slight distance forwardly of the rim 96 of the casing section 70 and it projects an appreciably greater distance rearwardly of the section 72, the rearwardly projecting portion thereof serving to carry a pulley 116 which constitutes the driven member or output pulley of the power train assembly 30. The level of lubricant maintained within the reservoir 74 may be maintained substantially constant by means of a conventional lubricant feed reservoir assembly which has been designated in its entirety at 117, the level of lubricant maintained in the reservoir preferably being such that the outer bearing race of the anti-friction bearing assembly 112 extends below the surface of the pool of oil contained within the reservoir 74 as indicated by the dotted lines in FIG. 6.

The rear end region of the drive shaft 58 projects outwardly from the lubricant chamber 74 through an end closure member 118 which is secured by screws 120 in position over the rear open end of the casing section 72. A lip type seal 122 serves to prevent egress of lubricant from the reservoir or chamber 74 to the atmosphere through the annulus existing between the closure member 118 and the drive shaft 58.

The central bore 59 provided in the tubular cutter drive shaft 58 is coextensive with the shaft. The previously mentioned clamping rod 60 extends completely through the bore 124 and forms an element of a releasable clamping assembly by means of which the various comminuting instrumentalities including the cutter assembly 50, the shear plate 52, the backing spider 54 and the impeller 56 may be operatively maintained in their respective operative positions within the chamber 34. The nature and function of the clamping rod 60 will become clear presently when the character of the various operative comminuting instrumentalities has been set forth.

The tubular cutter drive shaft 58 is of stepped configuration, the medial region 126 thereof, i.e., the region which is disposed within the lubricant chamber 74, being of relatively large diameter with successive diameter reductions being effected on opposite sides of the enlarged medial region. On the forward side of the enlarged medial region 126, three such progressively decreasing stepped regions 128, 130 and 132 are provided, while on the rear side of the medial region 126, two such progressively decreasing stepped regions 136, 138 are provided.

The region 128 is supported by the bearing assembly 112 and the inner race 140 of the assembly 112 is adapted to be clamped against the shoulder 142 existing between the regions 126 and 128 by means of a nut 144 which is threadedly received on a threaded section 146 of the region 128.

The region 130 projects through the central opening 90 provided in the rear wall 84 of the casing section 70 and an end-face seal assembly which is designated in its entirety at 148 serves to seal the annulus existing between the cylindrical surface of the region 130 and the cylindrical surface of the opening 90. The end-face seal 148 is of the type wherein a gas and liquid tight joint is effected between two running seal faces which are lapped to a high degree of flatness on the order of one and one-half times the wave length of light. While various forms of end-face seals are suitable for sealing the chambers 34 and 74 from each other, the particular seal employed herein includes a member 150 in the form of a ring commonly known by seal manuafacturers as a seat and which is secured to the wall 84 by means of fastening screws 151. The seal seat projects radially inwardly of the opening 90 and is sealed to the wall 84 by means of an O-ring seal 152.

The rear face of the seat member 150 as shown in FIG. 15 is formed with an enlarged threaded counterbore 149 which threadedly receives therein a retaining ring 153 having an undercut groove 155 providing a thin annular tongue 157 which extends into an annular groove 159 provided in an elastomeric sealing ring 161. The ring 161 is formed with an internal flexible sealing lip 163 which is compressed between the tongue 157 and the rotatable shaft 58 and is in sealing relationship with respect to the latter. The retaining ring 153 serves to compress the sealing ring 161 against the shoulder 165 afforded by the counterbore 149. This lip sealing ring 161, in combination with the spring-loaded sealing washer 158 insures that no product enters the bearings and lubricating chamber, and that atmosphere and oil from the lubricating chamber are likewise excluded from the product. The seat 150 presents a rearwardly facing flat sealing annulus 154 designed for running sealing engagement with a similarly flat sealing annulus 156 provided on a sealing ring 158 commonly known as a sealing "washer." The seat 150 and washer 158 may be formed of various materials commonly employed in the construction of end-face seals, cast iron being one such material. The washer 158 is axially slidable on the shaft 58 and is rotatable with the shaft through the medium of a brass or other metal retainer 160 which is pressed onto the region 130 and which has a lost motion driving connection with the seal 158 washer. A spring 162 surrounds the retainer 160 and normally urges the washer against the seat so as to compensate for wear between the parts. An elastomeric sleeve 164 surrounds the spring 162 and is cemented or otherwise secured to the washer 158 at its forward end and is similarly secured to the retainer 160 at its rear end.

The region 132 constitutes the end region of the tubular shaft 58 and it is non-circular in cross section. Preferably it is provided with a series of longitudinally extending splines 166 which receive thereover the internally splined impeller 56. The region 132 projects at least partially through the backing plate 54 for the cutter assembly 50 and the extreme end of the shaft projects into a splined recess or socket 168 formed in the hub portion 170 of the cutter assembly 50. The cutter assembly is thus rotatable with the drive shaft 58 and it is capable of limited axial sliding movement therealong, the clamping rod 60 serving to normally urge the cutter assembly 50 rearwardly in the chamber 34 and against the shear plate 52 in operative shearing relationship therewith in a manner and by mechanism that also will become clear as the following description ensues.

The Shear Plate and Its Mounting

Referring now to FIGS. 6, 9 and 11, the shear plate 52 is in the form of a flat circular perforated disc, the rear face of which is yieldingly clamped against the forward face of the backing spider 54, with both the shear plate 52 and the spider 54 extending vertically across the chamber 34 adjacent the extreme forward region of the latter and near the rim 96 of the casing 70. The shear plate 52 is of annular design and the internal diameter thereof is substantially equal to the external diameter of the hub 170, thus providing a central opening 172 in the plate through which the hub 170 projects with a fairly close fit and within which opening the hub 170 is adapted to rotate. The shear plate 52 has a narrow solid inner peripheral hub portion 174 and a similarly narrow outer peripheral solid rim portion 176 with an intervening perforated annulus. Between the hub portion 174 and rim portion 176, the annulus 52 is drilled to provide a series of shear holes 178, the number of which will control the fineness of the comminuted product. The number of holes employed and the specific hole pattern may vary in wide limits. In an exemplary form of the invention where a shear plate having a drilled annulus of approximately 9½ inches external diameter and 5⅛ inches internal diameter, satisfactory results will be obtained with shear holes ranging from 1000 to 10,000 in number. In accordance with conventional practice, one or more interlocking pairs of keys and recesses 180, 182 respectively are provided on the casing 70 and in the periphery of the shear plate 52 to prevent turning movement of the shear plate within the chamber 34.

The Backing Spider

As shown in FIGS. 6 and 7, the backing spider 54 is of ring-like design and includes an inner circular hub portion 190, an outer peripheral circular rim portion 192 and a series of interconnecting radial webs or spokes 194 which are equally spaced from each other circumferentially. While any number of such spokes may be provided, in the illustrated form of the invention, eight such spokes extend in diverging fashion at an angle of 45° from each other. The spider 54 fits loosely within the cylindrical wall of the chamber 34 and the rear face of the rim portion 192 seats on a shoulder 196, and against which shoulder the spider is yieldingly urged under the influence of the axial thrust of the cutter assembly 50 which bears against the shear plate 52 and in turn forces the latter against the backing spider 54. The keys 180 on the casing 70 extend into notches 198 provided in the spider and thus the spider is maintained against turning movement within the chamber 34.

The circular hub 190 and circular rim 192, in combination with the radial webs 194, define a series of eight generally trapezoidal openings 200 through which the product issuing from the shear plate 52 is adapted to pass rearwardly. The forward sides of the various spokes 194, as well as of the hub 190 and rim 192, are bevelled as at 202 on a relatively sharp angle as best seen in FIG. 7a to enhance the movement of the product rearwardly through the spider toward the rear regions of the chamber 34 where it is operated upon by the impeller 56 and discharged from the chamber 34 through the discharge conduit 40 in a manner that will be made clear presently. The webs 194 are thus generally triangular in transverse cross section and present thin linear edges 203 which, in their radial extent across the forward face of the shear plate, intersect only a relatively few of the shear plate openings. Because of the fact that the backing spider 54 reinforces the shear plate 52 at varying radial distances, the use of a relatively thin shear plate may be resorted to without resulting in deflection or rearward bowing of the shear plate. Additionally, because little friction is developed during passage of the product through the spider, undue internal temperatures which otherwise would be created under the influence of friction are avoided.

The Cutter Assembly

Referring now to FIGS. 6, 9 and 10, the cutter assembly 50 involves in its general organization a cutter body or head 210 in the form of a three-arm spider or blade support, the central hub portion 170 of which presents a generally cylindrical surface 214 and a rear frusto-conical surface 216. The cylindrical surface 214 fits telescopically and slidably within the hub 174 of the shear plate 52. The previously mentioned splined socket 168 is telescopically received over the splined end region 132 of the tubular drive shaft 58. Formed on the hub portion 212 of the cutter body 210 are a series of three radial knife-supporting arms 218. These arms diverge radially from one another at angles of 120° with the individual arms being inclined forwardly in the rotary direction of lead of the impeller assembly as indicated by the arrow in FIG. 9. The trailing sides 220 of the arms extend substantially tangential to the cylindrical surface 214 of the hub 210 while the leading faces 222 of the arms extend substantially truly radially of the hub 210 as best seen in FIG. 9. The underneath faces 224 of the arms 218, as viewed in FIG. 10, lie substantially in a common plane while the forward leading faces of the arms are undercut and extend forwardly and upwardly and terminate in sharp product-penetrating edges 228. The outer or distal end faces 225 of the arms 218 are curved and, in combination with the leading faces 222, define relatively sharp shearing edges 226 designed for shearing cooperation with a series of gristle shearing lugs 227 carried on the radial wall of cutting chamber 34a located in rim 99 at the outlet end of throat member 100 and the nature of which will be set forth presently. The underneath face 224 of each arm is formed with a generally radially extending groove 229, the planar extension of which passes in secant fashion through the hub 210 and within each groove 229 is secured as by furnace brazing a knife blade proper 230 in the form of a hardened steel plate which projects outwardly beyond the face 224 and is provided with a sharp cutting or shearing edge 232 adapted to sweep around the forward face of the shear plate 52 in the usual manner of shearing cooperation between the knife blades and shear plates of conventional rotary cutters.

The Cutter Biasing Mechanism

As previously stated, means are provided for normally biasing the entire cutter assembly 50 to the right as viewed in FIG. 6 to bring the shearing edges 232 of the various knife blades 230 into shearing contact with the forward face of the shear plate 52. Accordingly, as best seen in FIGS. 5 and 6 the forward end region of the clamping rod 60 projects forwardly beyond the end of the splined region 132 of the tubular drive shaft 58 and extends into a socket or recess 234 provided in the cutter hub 170. The extreme end of the rod terminates in the general plane of the rim of the socket. This projecting end of the rod 60 is formed with an annular groove 236 adapted to receive therein a split retainer 238 of the half-moon variety, the retainer nesting within the socket 234 when the various parts are in their operative position. The portion of the rod 60 which passes through the splined section 132 of the shaft 58 is sealed to the bore of the shaft by O-ring seals 239 as best seen in FIG. 6.

As previously stated, the rear end region of the tubular drive shaft 58 projects rearwardly of the closure member 118 and carries the pulley 116. This rear end region of the shaft 58 terminates within an axial bore 241 formed in the pulley 116 while the rear end region of the rod 60 projects outwardly beyond the rear end of the tubular drive shaft 58 and beyond the rear end of the pulley 116 and has its extreme rear end region threaded as at 242 (FIGS. 4 and 5) for reception thereover of the nut 62. A helical compression spring 243 is disposed within the annular space existing between the rod 60 and the wall of the bore 241 and bears at its forward end against the extreme rear end of the tubular drive shaft 58 and at its rear end against the nut 62. The spring 243 thus normally urges the clamping rod 60 axially to the right as viewed in FIGS. 5 and 6 and this rod, being slidable within the bore 59 of the drive shaft, thus normally pulls the entire cutter assembly 50 toward the shear plate 52 as previously described. In order to prevent turning of the clamping rod 60 within the bore 59, a longitudinally extending groove 235 (FIG. 5) is formed in the rod 60 and slidably receives therein the inner end of a screw 237 which is radially and threadedly received through the wall of the tubular drive shaft 58.

In order that the three knife blades 230 shall seat squarely upon the forward face of the shear plate 52 at all times, with no possibility of separation therefrom due to misalignment of the parts, the splined region 130 of the drive shaft 58 does not have a tight fit within the splined recess 168 (FIG. 9) and thus the cutter hub 210 is capable of limited universal movement on the extreme forward end of the shaft 58. By the term "limited universal movement" as used herein, is meant the amount of play or wobble permitted between the splined region 166 of the drive shaft 58 and the splined recess 168 of the hub by virtue of the slightly loose or non-tight fit of the referred to splined parts. Since, geometrically speaking, any three points in space define a common plane, and since only three knife blades are employed herein, it is obvious that each of the knife blades will at all times be firmly yet evenly drawn into operative engagement with the forward operative shearing face of the shear plate 52. By regulating the degree of compressional force applied to the spring 243 by the nut 62, a constant tension may be applied on the cutter assembly.

*The Centrifugal Impeller*

The impeller 56 is best illustrated in FIGS. 6 and 8 and is in the form of a three-bladed spider-like body having a central hub region 244 which merges gradually with a series of three radially diverging tapering expeller arms or blades 245. The impeller body is of uniform thickness throughout, its thickness being appreciably great to enhance its effectiveness in centrifugally expelling the comminuted material which has passed through the shear plate 52 and spider 54 from the chamber 34.

The hub region 244 is formed with a central splined opening 246 therethrough by means of which the impeller is splined to the region 132 of the tubular drive shaft 58. The impeller is prevented from engaging the rear face of the spider 54 during initial assembly operations and it is maintained out of contact with the spider during operation of the apparatus by means of a series of three nylon, Teflon or other anti-friction plugs 247 having long wear properties and which are set into sockets 248 which are drilled in the forward face of the expeller arms 245. The outer ends of these anti-friction plugs are adapted to frictionally engage and slide upon the rear face of the narrow hub portion 190 of the backing spider 54.

The discharge conduit 40 communicates with the chamber 34 through a product discharge opening 249 formed in the wall of the chamber 34 in the side regions of the latter. The opening 241 communicates with the lower end of the inclined discharge chute 40.

*The Gristle Breaking Instrumentalities*

The comminuting and emulsifying instrumentalities of the present invention have associated therewith gristle severing means whereby any tendons, ligaments, small bone nodules and other forms of gristle may be reduced in size by a shearing action which is effected between the various knife-supporting arms 218 and a series of four of the previously mentioned gristle shearing or breaking lugs 227 (FIGS. 6 and 9).

These gristle shearing or breaking lugs 227 are in the form of hardened steel blocks which are square in cross section and which are formed with cylindrical shank portions 227a which extend through radial bores 253 formed in the wall of the cutting chamber 34a located in rim 99 at the outlet end of throat 100 at regions which are circumferentially spaced 90° apart. The outer ends of the shank portions 227a are threaded as at 255 and receive thereover fastening nuts 257 which are accessible exteriorly of the casing for replacement of the lugs 227 when desired. The shank portion 227a of each lugs 227 is sealed to the wall of cutting chamber 34a located in rim 99 by means of an O-ring 259. The various lugs proper 227 seat within shallow square recesses 261, as best seen in FIG. 9, and thus, by loosening of the various nuts 257, the positions of the lugs 227 may be adjusted by turning the lugs about the axes of the various lug shanks throughout angles of 90° to present any one of the four shearing edges associated with the lugs counter to the direction of sweeping movement of the knife-supporting arms 218. Upon rotation of the cutter assembly 50 in the direction of the arrow in FIG. 9, the arcuate faces 225 of the knife blade-supporting arms 218 sweep within the chamber 34a in the rim 99 of the hopper throat 100 in close proximity to the planar inside faces of the lugs 227 so that the leading edges 226 of the arcuate faces 225 serve to break, fracture or shear any particles of gristle which they may encounter as they move across the lugs 227.

THE FEED HOPPER ASSEMBLY

Referring now to FIGS. 1, 3 and 5, the feed hopper assembly 24 is slidable toward and away from the composite housing 32 between the operative advanced position of the assembly and the retracted position thereof respectively and, in so sliding, the assembly 24 is guided on a pair of guide rods 250, 251, these rods being supported in spaced parallel relationship above the level of the base plate 14 by means of standards 252. The hopper proper 36 is in the form of a stainless steel shell of generally conical design having a slant angle in the neighborhood of approximately 45°, the cone being inverted and having the small base or rim thereof welded as at 254 to the open upper end of the hopper throat member 100. The hopper shell 36 is maintained in its inverted position by means of supporting struts 256 which extend between the upper regions of the shell and a pair of guide sleeves 258 slidably disposed on the guide rods 250 respectively. A flat web 260 extends between the two sleeves 258, is integral therewith, and may be integrally formed with the throat member 100 if desired. The lower open end of the throat member 100 is adapted to communicate through the web 260 with the forward open end of the casing section 70 when the hopper assembly is in its operative assembled position on the housing 22. A tubular strut 165 extends horizontally between the two sleeves 258 and, in addition to its reinforcing function, serves as a limit stop for determining the home position of certain toggle mechanism, the nature and function of which will be set forth presently. To prevent swirling of the material fed to the hopper, a series of raised veins or ribs 273 are formed internally of the hopper throat 100.

Referring now to FIGS. 5, 6, 6a and 6b, it will be seen that a tangent line extending along the generally frustoconical hopper assembly including both the hopper proper 36 and the hopper throat 100 at the rear side of the hopper is substantially linearly straight (FIG. 5) with the line being inclined relative to a horizontal plane at an angle of approximately 45°. The net effect of this shape phenomena is to provide a linear ramp in the form of a curved wall trough having a slant angle which is appreciably greater than the angle of repose at which product particles will fail to slide freely along the ramp. In other words, this ramp portion of the hopper assembly is sufficiently steep as to insure movement of the product therealong without obstruction. The throat portion 100 of the hopper presents an internal surface which, as shown in FIGS. 6 and 6a, is truly circular in horizontal cross section and which, as shown in FIG. 6b, is elliptical in transverse cross section, i.e., in a plane extending at a right angle to the inclined central axis of the hopper throat 100. The minor axis of the ellipse extends across the hopper throat as indicated by the dotted line 263 in FIG. 6 while the major axis extends at a right angle to the minor axis horizontally across the hopper throat. In vertical cross section as indicated by the dotted line 265 in FIG. 6, the cross sectional contour of the hopper throat is circular so that the forwardly facing throat opening which is in register with the forward open rim of the casing section 70 is circular.

Manually operable means are provided for shifting the hopper assembly 36 between its advanced and retracted positions, such means being in the form of the previously mentioned toggle mechanism which has been designated in its entirety at 42 (FIGS. 1 and 6). The toggle mechanism 42 includes a pair of toggle links including a dual link assembly 264 consisting of parallel link bars connected at their rear ends to a cross pin 266 carried at the outer end of a threaded rod 268, the inner end of the rod being threadedly received as at 270 in the socket 272 (FIG. 5) provided in a boss 274 formed on the side wall of the hopper throat 100. A nut and washer assembly 276 serves to lock the threaded rod 268 in any selected position of axial adjustment within the socket 272. The forward ends of the parallel links 264 are connected by a cross pin 278 to a second toggle link 280, this latter link constituting one leg of a bell crank lever 282, the other leg of the lever being in the form of an operating arm 284 provided with a manipulating handle 286 at its upper end. The base or bight of the bell crank lever 282 is pivoted on a pin 288 which extends between a pair of ears 290 integrally formed on the forward standard 252.

As previously stated, the hopper assembly 36 is movable between the advanced operative position wherein it is shown in FIG. 1 and the retracted inoperative position wherein it is shown in FIG. 2. When the hopper assembly 36 is in its advanced position, the operating lever 284 assumes a forwardly and upwardly inclined position as shown in FIG. 1 with the toggle links 280, 264 extending in substantial alignment but just over toggle dead center. With the toggle links thus positioned, maximum toggle length is attained and, by virtue of the adjustment of the nut 276, the extreme forward rim 96 of the casing 70 and the bottom wall of the recess 98 provided on the hopper throat 100 are forced into firm sealing engagement. To prevent "breaking" of the toggle links 280, 264, the lower edge 291 of the toggle link 264 is designed for engagement with the tubular strut 165. A rectangular slot 292 is provided in the standard 252 and within this slot the bell crank lever 282 is adapted to operate.

In order to move the hopper assembly to its retracted position as shown in FIG. 4, it is merely necessary to pull the handle 286 rearwardly so that the bell crank lever 282 assumes the position wherein it is shown in this figure whereupon the toggle links 280, 264 will be "broken" and the feed hopper assembly 24 will be moved to its retracted position with the guide sleeves 258 assuming positions on the guide rods 250 near the forward end thereof. In this position of the hopper assembly 24, the forward open end of the casing section 70 is accessible and the cutter assembly 50 is in full view. The movement of the hopper assembly 24 to its retracted position may be effected incident to this assembly of the various cutting instrumentalities in a manner that will be described subsequently.

THE DRIVING MOTOR AND POWER TRAIN ASSEMBLY

The motor assembly 28 includes a motor base plate 300 (FIGS. 1 and 5) having a pair of depending lugs 302 adjacent each end thereof and by means of which the base plate is supported on a pair of supporting shafts 304 which extend through the lugs 302 at each end of the base plate and are themselves carried in upstanding supporting ears 306 formed on the upper face of a flat horizontal table portion 308 associated with an inverted boxlike casting 310 which constitutes the stationary framework of the previously mentioned motor support and tool-retaining assembly 26. The base plate 300 thus is supported in an elevated position above this latter assembly and a driving motor M is bolted as at 312 in position on the base plate. The motor M is of conventional design and it is provided with a motor shaft 314 on which there is disposed a driving pulley 316 of the multiple groove type. The previously mentioned driven pulley 116 of the power train assembly 30 which is mounted on the tubular drive shaft 58 is also of the multiple groove type and a series of driving belts 318 extend over the two pulleys 316 and 116 in driving relationship. It will be noted that the pulley 116 has a rearwardly extending annular portion which circumscribes the spring 243 for predetermining the extent to which the tool socket of the tool assembly may engage the nut 62 to limit the amount the spring 243 may be compressed or tensioned. The belt and pulley assembly 316, 318, 116 is enclosed in a sheet metal casing 320 suitably mounted on the base plate 14, the casing affording a protective cover for the driving mechanism. Suitable set screws 322 and 324 serve to anchor the pulleys 316 and 116 respectively in vertical alignment on their respective shafts 314 and 58. The sheet metal casing 320 may be stabilized by a connecting strap 326 which extends between the rear wall of the casing and the front side surface of the base plate 300.

THE TOOL RETAINING ASSEMBLY

The combined motor support and tool retaining assembly 26 is best seen in FIGS. 1, 2 and 5. This assembly has as its principal component the previously mentioned inverted box-like casting 310 which provides the table support 308 for the motor base plate 300 as previously described. The table support 308 is carried on a pair of side members 350 and 352 which may be bolted as at 354 to the base plate 14. The tool unit or wrench 64 is in the form of a capstan wheel having a central hub 356 from which there extends radially a series of operating bars 358. The hub is provided with an axial bore 360 into which bore the forward end of the previously mentioned wrench shaft 66 extends and in which it is pinned as at 362. As will be explained presently, the wrench shaft 66 serves a dual function of rotatably supporting the capstan wrench on the casting 310 and of actuating certain limit switch instrumentalities, the nature and function of which will be set forth presently. The shaft 66 is rotatable and axially slidable in an elongated bore 364 formed in the table portion 308 and normally the shaft 66 is maintained in the retracted position in which it is shown in FIG. 5 by means of a spring pressed detent 366 which registers with an annular groove 368 provided in the shaft 66. The shaft 66 and capstan wrench 64 carried thereby are shiftable bodily as a unit forwardly of the casting 310 to bring the wrench 64 into operative register and engagement with the nut 62 carried on the rear end of the clamping rod 60 in order that the wrench may be employed for nut loosening and removal purposes. Accordingly, the shaft 66 and wrench 64 are in axial alignment with the rod 60 and the hub 356 of the wrench 64 is formed with a socket 370 (see also FIG. 12) the configuration of the socket conforming to that of the nut 62, such configuration preferably being square, although other non-circular configurations are contemplated. Each side face of the nut 62 is formed with a socket 372 therein, the various sockets being designed for selective register with the inner end of a spring-pressed plunger which extends through one side wall of the socket 370 and which is slidable in a bore 376 provided in an upstanding boss 378 formed on the hub 356. The plunger 374 is provided with a stem 380 which projects outwardly through a plug 381 threadedly received within the bore 376 and a compression spring 382 surrounds the stem 380 and bears at one end against the plug 381 and at its other end against the shoulder 384 which exists between the plunger 374 and its stem 380. It will be seen, therefore, that the plunger 374 is at all times yieldingly urged to an advanced position wherein the inner end thereof projects into the socket 370. A lifting bail 386 is carried at the outer end of the stem 380.

From the above description, it will be seen that in order to loosen and remove the nut 62 from the threaded end 244 of the rod 60, the capstan wrench 64 may manually be pulled forwardly while at the same time the bail 386 may be manipulated to lift the plunger and withdraw the end thereof from the socket 370 so that the socket may be telescopically received over the nut 62 in the manner indicated in FIG. 4. Upon release of the bail 386 the end of the plunger 374 will drop into one of the holes 372 provided in the side faces of the nut 62 so that the nut will be captured, so to speak, by the capstan wrench 64. The wrench may then be turned to loosen and ultimately remove the nut 62 from the rod 60 after which the capstan wrench and the shaft 66 on which it is mounted may be slid rearwardly to their retracted positions wherein the detent 366 seats within the groove 368. The nut 62 will remain within the socket 370 thus preventing possible misplacement or loss of the nut while at the same time maintaining the nut in a convenient position of alignment with the threaded end of the rod 60 for ready reapplication to the rod 60 after assembly of the various comminuting instrumentalities associated with the housing 32 has been completed.

THE MOTOR DEENERGIZING
SAFETY MECHANISM

As previously stated, means are provided for deenergizing the electrical circuit for the motor M when either the capstan wrench 64 is moved from its normally inoperative or retracted position or when the hopper assembly 24 is moved from its operative position of registry with the casing section 70.

Accordingly, as best seen in FIGS. 4 and 5, the thrust rod 44 extends from the vicinity of the forward rim 96 of the casing 70, rearwardly past the entire housing assembly 32, through the sheet metal casing 320 of the power train assembly 30, through the side members 350 and 352 of the inverted box-like casting 310 and into a chamber 400 (see also FIG. 13) afforded on the rear face of the side member 352 by virtue of a sheet metal box-like structure 402 suitably secured to the casting. The rear end of the rod 44 is designed for camming engagement with the actuating finger 404 of a microswitch MS1 secured by screws 406 to the side member 352. As shown in FIG. 14, the microswitch MS1 is of the normally open type and includes a pair of normally open contacts C1 which are disposed in the electric circuit for the motor M and which are adapted to become closed when the actuating finger 404 associated therewith is engaged by the end of the rod 44 as shown in dotted lines.

Similarly, as best seen in FIGS. 5 and 13, the axially slidable shaft 66 projects through the side member 352 and into the chamber 400 where the extreme rear end region thereof cooperates with the actuating finger 408 (FIG. 14) of a microswitch MS2 secured by screws 406 to the side member 352. The microswitch MS2 is also of the normally open type and includes a pair of normally open contacts C2 (FIG. 14) which are disposed in the motor circuit of the motor M and which are adapted to become closed when the end region of the shaft 66 is withdrawn from contact with the actuating finger 408. It is to be noted at this point that the box-like structure which encloses the microswitches MS1 and MS2 has a front wall 412 which conceals these electrical instrumentalities and which presents a void or opening 414 at the bottom of the structure for the drainage of any condensate or other moisture from the interior of the structure.

*The Circuit Diagram*

Referring now to the circuit diagram of FIG. 14, upon closure of a manual circuit breaker of any well-known type, such as the master switch MS, the electric circuit for the motor M will become energized. This circuit extends from the positive side 500 of the power line through lead 501, the motor M, lead 502, normally closed contacts C2 of the microswitch MS2, lead 503, normally closed contacts C1 of the microswitch MS1, and lead 504 to the negative side 505 of the line. The motor will normally remain energized as long as the master switch MS remains closed. However, at such time as either pair of contacts C1 or C2 becomes open due to removal of the hopper assembly 24 from its operative position of close proximity and register with the casing section 70 in the manner previously described, or due to removal of the capstan wrench 64 from its retracted position adjacent the side member 350 of the box-like casting 310, one or the other of the series-arranged pairs of contacts C1 or C2 will become open, thus opening the previously described motor circuit and deenergizing the motor and terminating the operation of the apparatus.

From the above description, it is thought that the operation and many advantages of the herein described comminuting apparatus will have become sufficiently well understood that only a brief résumé of the operation of the apparatus as a whole need be set forth. The product which is fed to the hopper assembly 24 is usually preworked in a suitable grinder so that it enters the hopper assembly in a rough emulsion state. It is prevented from swirling within the hopper by means of the veins 273 which are cast in the metal of the throat 100. Any particles or lumps of gristle such as veins, sinews, tendons, small pieces of bone and the like which may be present in the product entering the chamber 34 from the hopper assembly 24 are broken up by the cooperation of the gristle-breaking or shearing lugs 227 with the end surfaces 225 of the knife-supporting arms 218.

The leading edges 228 of the blade-supporting arms 218 advance in rotary fashion through the product within the chamber 34 and perform a certain amount of product severing. The inclined faces 222 exert an impelling action on the product as the arms 218 penetrate the latter and the product is forced toward the shear plate where it creates a region of relatively high pressure in the immediate vicinity of the plate. The shearing edges 232 of the knife blades proper 230 cooperate with the perforations in the shear plate 52 and the product readily passes through the perforations due to the pressure differential on opposite sides of the plate. The magnitude of this pressure differential is enhanced by the creation of a partial vacuum or low pressure region within the chamber 34 in the vicinity of the impeller 56, such low pressure region existing by virtue of the centrifugal expelling action of the impeller 56. The comminuted material issuing from the impeller blades is forced through the opening 249 and into the composite sectional discharge conduit 40. The upper end of the discharge conduit is turned downwardly as at 416 to facilitate discharge of the comminuted material into a suitable receptacle.

While one specific and preferred form of the comminuting apparatus has been illustrated and described herein, it will be understood that this form does not by any means indicate the only form contemplated. The form illustrated is only one which has been developed for commercial application of the invention.

The invention therefore is not to be limited to the precise arrangement of parts shown in the accompanying drawings or described in this specification since various changes in the details of construction may be resorted to without departing the spirit of the invention. For example, while in the accompanying drawings and throughout this specification the composite housing assembly 70, 72, and consequently the generally cylindrical comminuting chamber 34 enclosed thereby has been illustrated and described as having its central axis extending horizontally, it is obvious that the proper functioning of the various comminuting instrumentalities within the chamber will not be impaired by otherwise positioning the housing assembly. If such assembly be positioned so that its central axis extends vertically, the character of the feed hopper may be altered so that the raw food products are fed vertically downwardly into the rim of the comminuting chamber and, in such an instance, this upper rim of the chamber may, for purposes of claim terminology herein be regarded as the forward rim of the chamber with the herein stated forward and rearward directions of the product feed being regarded as upward and downward directions of feed respectively. Only insofar as the invention has particularly been pointed out in the accompanying claims is the same to be limited.

I claim:

1. In an apparatus for comminuting food products, in combination, a housing having an end closure, a shear plate in said housing, a cutter mounted for rotation within the housing and having blades adapted to sweep the adjacent surface of the shear plate, a rotatable tubular drive shaft projecting through the shear plate and end closure, means connecting said drive shaft and cutter in driving relationship while permitting a limited play between the cutter and the shaft, a tension-applying clamping rod projecting through said drive shaft, a retainer removably mounted on the one end of the rod and adapted when the rod is pulled to engage the cutter to force the same against the shear plate in operative shearing relation, a fastening nut threadedly received on the other end of the rod, and a spring interposed between said nut and the rear end of the drive shaft for yieldingly urging said rod in the direction of said nut.

2. In an apparatus for comminuting food products, in combination, a housing defining at least in part, an internal comminuting chamber and being provided with a rim through which the front end of the chamber communicates with the atmosphere, a substantially flat shear plate having a perforated annulus seated within the housing and extending across the chamber transversely of the housing, a tubular rotary drive shaft having an axial bore extending therethrough, the forward end of said drive shaft terminating in the vicinity of said shear plate, said shear plate being formed with a central opening therein, a spider-like cutter blade support including a central hub from which there diverge radially outwardly equally and circumferentially spaced blade-supporting arms, the rear end of said hub being formed with a splined socket, the forward end region of said drive shaft being splined and loosely fitting within said splined socket to permit limited universal and sliding movement of the hub relative to the axis of the drive shaft, a cutter blade mounted on each arm and having a shearing edge radially spanning said perforated annulus and adapted to sweep the adjacent side thereof in rotary fashion, the shearing edges being coplanar, a clamping rod extending through said bore of the tubular drive shaft and projecting through said opening in the shear plate and forwardly of the shear plate, the rear end region of said rod projecting rearwardly beyond the rear end of said tubular drive shaft and being threaded, an adjusting nut threadedly received on said threaded rear end of said rod, a compression spring surrounding said rod and interposed between said nut and said rear end of the drive shaft whereby said rod is normally and yieldingly urged rearwardly in said bore, and interengaging means between the forwardly projecting portion of said rod and said hub whereby said hub is urged rearwardly and said shearing edges of the cutter blades are caused to seat flush against said shear plate.

3. In an apparatus for comminuting food products, in combination, a housing having a rear end closure, a shear plate in said housing, a cutter mounted for rotation within the housing and having blades adapted to sweep the adjacent surface of the shear plate, a tubular drive shaft drivingly connected to the cutter and projecting through the shear plate and rear end closure, a tension-applying clamping rod projecting completely through said drive shaft, a retainer removably mounted on the forward end of the rod and adapted when the rod is tensioned toward the rear closure to engage the cutter to force the same against the shear plate in operative shearing relation, a fastening nut threadedly received on the rear end of the rod, a spring interposed between said nut and a shoulder surface on the drive shaft for yieldingly urging said rod in the direction away from the cutter, a tool support adjacent said housing, a rotary tool-supporting shaft mounted for axial sliding movement in said tool support and in axial alignment with said clamping rod, and a tool mounted on the said tool-supporting shaft and movable bodily with the latter, said tool-supporting shaft being axially slidable between a retracted rear position wherein said tool is out of operative engagement with the nut and an operative position wherein said tool operatively engages the nut to adjust the tension of said spring upon turning said tool in a preselected direction.

4. In an apparatus for comminuting food products, in combination, a housing having an end closure, a shear plate in said housing, a cutter mounted for rotation within the housing and having blades adapted to sweep the adjacent surface of the shear plate, a tubular drive shaft drivingly connected to the cutter and projecting through the shear plate and end closure, a tension-applying clamping rod projecting completely through said drive shaft, a retainer removably mounted on one end of the rod and adapted when the rod is tensioned rearwardly to engage the cutter and force the same against the shear plate in operative shearing relation, a fastening nut threadedly received on the rear end of the rod, a spring interposed between said nut and drive shaft for yieldingly urging the rod rearwardly, a tool support adjacent said housing, a rotary tool-supporting shaft mounted for axial sliding movement in said tool support in axial alignment with said clamping rod, a tool in the form of a socket wrench fitting said nut and mounted on the end of said tool-supporting shaft with the socket thereof in axial register with the nut on said rod, said tool-supporting shaft being axially slidable between a retracted rear position wherein said tool is out of operative engagement with the nut and an operative position wherein said tool operatively engages the nut for adjusting the tension of said spring upon turning said tool in a preselected direction, and releasable nut-retaining means for locking said nut within the confines of the tool socket.

5. In an apparatus for comminuting food products, the combination set forth in claim 4, wherein said nut is formed with a depression in one side and wherein said releasable nut-retaining means comprises a plunger slidable in the wall of said socket and movable between a retracted position out of engagement with the nut and an advanced position in which an end extends into said depression.

6. In an apparatus for comminuting food products, in combination, a housing having an end closure, a shear plate in said housing, a cutter mounted for rotation within the housing and having blades adapted to sweep the adjacent surface of the plate, a tubular drive shaft drivingly connected to the cutter projecting through the shear plate and end closure, a tension-applying clamping rod projecting completely through said drive shaft, a retainer removably mounted on an end of the rod and adapted when the rod is pulled rearwardly to engage the cutter and force the same against the shear plate in operative shearing relation, a fastening nut threadedly received on the other end of the rod, a tensioned spring interposed between said nut and drive shaft for yieldingly urging the rod rearwardly, a tool support adjacent said housing, a rotary tool-supporting shaft mounted for axial sliding movement in said tool support in axial alignment with said clamping rod, a tool in the form of a capstan wrench having a socket fitting said nut, said tool being fixedly mounted on said tool-supporting shaft and movable bodily therewith, said tool-supporting shaft being axially slidable between a retracted position wherein said tool is out of engagement with the nut and an operative position wherein said tool operatively engages the nut for adjusting the tension of said spring upon turning said tool in a preselected direction, means for locking said nut within the confines of the tool socket, a driving pulley mounted on the rear end of said drive shaft and having a portion thereof projecting toward the rear end of the latter.

7. In an apparatus for comminuting food products, in combination, a housing having an end closure, a shear plate in said housing, a cutter mounted for rotation within the housing and having blades adapted to sweep the adjacent surface of the shear plate, a tubular drive shaft drivingly connected to the cutter and projecting through the shear plate and end closure, a tension-applying clamping rod projecting completely through said drive shaft, a retainer removably mounted on an end of the rod and adapted when the rod is pulled rearwardly to engage the cutter and force the same against the shear plate in operative shearing relation, a fastening nut threadedly received on the other end of the rod, a tensioned spring interposed between said nut and drive shaft for yieldingly urging the rod rearwardly, a tool support adjacent said housing, a rotary tool-supporting shaft mounted for axial sliding movement in said tool support in axial alignment with said clamping rod, an electric motor operatively connected to said drive shaft in driving relationship, an electric circuit for said motor, a tool mounted on said tool-supporting shaft and movable bodily with the latter between a retracted position wherein it is out of operative engagement with the nut and an advanced position wherein it operatively engages the nut for adjusting the tension of said spring upon turning said tool in a preselected direction, a pair of normally open contacts disposed in said motor circuit, contact-actuating means operable under the control of said tool-supporting shaft when the latter is in its retracted position for maintaining said contacts closed, said means being operable by the tool-supporting shaft upon its movement away from its retracted position toward its advanced position for disengaging said contact actuating means thus opening said contacts.

8. In an apparatus for comminuting food products, in combination, a housing defining at least in part an internal generally cylindrical comminuting chamber the axis of which extends horizontally, said housing being provided with a circular rim through which the front end of the chamber communicates with the atmosphere, comminuting instrumentalities operable within the chamber upon raw food products introduced into the chamber through said rim, a feed hopper for said comminuting chamber comprising an upper hopper section proper and a lower throat section establishing communication between the hopper section and the circular rim of the comminuting chamber, said hopper section presenting a smooth inside funnel-like surface of inverted frusto-conical configuration, the small base of said inverted frusto-conical surface being circular, said throat section presenting an internal smooth surface having an upper circular rim in register and communication with said small base of the frusto-conical surface of the hopper section and a lower circular rim in register and communication with said circular rim of the comminuting chamber, said small base and said lower circular rim being in transverse planes, and the intermediate reaches of said internal surface of the throat section being circular in both vertical and horizontal cross section at the respective ends adjacent said upper circular rim and said lower circular rim and being elliptical in transverse cross section in the area between said ends.

9. In an apparatus for comminuting food products the combination of a flat, horizontally extending, generally rectangular support base, wheels respectively mounted on the base near the four corners thereof, a housing fixedly mounted on said base and forming a generally cylindrical comminuting chamber having its axis extending horizontally and longitudinally of the base, said housing being provided with a rim portion at one end thereof, comminuting elements within said chamber, a drive shaft operatively connected to said comminuting elements and extending coaxial with said chamber and outwardly therefrom towards one end of said base, means forming a discharge for comminuted food products directed laterally from said chamber, a drive motor mounted upon near said one end of said base in elevated position with respect to said base and having a horizontal motor shaft spaced vertically above said drive shaft, means including a drive belt operatively connecting said drive shaft and said motor shaft, a feed hopper mounted upon near the end of said base remote from said motor, said hopper extending generally vertically above said base and having an enlarged open upper end through which food products to be comminuted are fed, said hopper tapering downwardly and inwardly from said upper end towards a throat portion presenting a rim region in axial alignment with the rim of the housing, and sealing means disposed between the rim region of the hopper and the rim of the housing.

10. In an apparatus for comminuting food products the combination of a flat, horizontally extending support base, a housing fixedly mounted on said base and forming a generally cylindrical comminuting chamber having its axis extending horizontally and longitudinally of the base, said housing being provided with a rim portion at one end thereof, comminuting elements within said chamber, a drive shaft operatively connected to said comminuting elements and extending coaxial with said chamber and outwardly therefrom towards one end of said base, means forming a discharge for comminuted food products directed laterally from said chamber, a drive motor mounted upon near said one end of said base in elevated position above said base and having a horizontal motor shaft spaced vertically above said drive shaft, means operatively connecting said drive shaft and said motor shaft, a feed hopper mounted upon near the end of said base remote from said motor, said hopper extending generally vertically above said base and having an enlarged open upper end through which food products to be comminuted are fed, and said hopper tapering downwardly and inwardly from said upper end towards a throat portion presenting a rim region in axial alignment with the rim of the housing.

11. In an apparatus for comminuting food products, in combination, a housing defining an internal comminuting chamber, a perforate shear plate extending across said chamber and dividing the same into a product-receiving and a product discharge chamber respectively, a spider-like cutter blade support including a central hub and a plurality of blade-supporting arms extending outwardly from said hub, a cutter blade on each arm and having a shearing edge designed for shearing cooperation with one side of said perforate shear plate, a cutter drive shaft extending into said chamber and coaxial with the shear plate and hub, means connecting said drive shaft and hub in driving relationship, the last named means including structure permitting a limited play between the hub and the drive shaft of such amount that the shearing edges of the cutter blades may be aligned in a plane at a slight angle with respect to a plane normal to the axis of the drive shaft in order to maintain the cutter blades in frictional engagement with shear plate despite wear on the blades and the plate, means urging said cutter blades into frictional engagement against said shear plate, and means for rotating said drive shaft.

12. In an apparatus for comminuting food products, the combination set forth in claim 11 wherein said shear plate is formed with a central opening, the central hub of the cutter blade support extending through said opening and being connected to said shaft on the other side of the shear plate.

13. Apparatus according to claim 11, wherein said plurality of blade-supporting arms comprise three such arms uniformly spaced about and extending generally radially from said hub.

14. In an apparatus for comminuting food products, the combination set forth in claim 13 wherein said structure comprises a series of loosely interengaging splines on said drive shaft and hub respectively.

References Cited in the file of this patent

UNITED STATES PATENTS

| | | |
|---|---|---|
| 408,945 | Wilder | Aug. 13, 1889 |
| 1,821,344 | Kautzman et al. | Sept. 1, 1931 |
| 2,208,796 | Jaenichen et al. | July 23, 1940 |
| 2,421,064 | Hilliker | May 27, 1947 |
| 2,594,894 | Fehrenbach | Apr. 29, 1952 |
| 2,842,177 | Schnell | July 8, 1958 |
| 2,977,056 | Gustke | Mar. 28, 1961 |

FOREIGN PATENTS

| | | |
|---|---|---|
| 804,408 | Great Britain | Nov. 12, 1958 |